Jan. 1, 1929.

L. BLACKMORE 1,697,806

ILLUMINATED INSTRUMENT PANEL

Filed May 5, 1927

Inventor
Lloyd Blackmore

By Blackmore, Spencer & Hurl
Attorneys

Jan. 1, 1929.                     1,697,806
L. BLACKMORE
ILLUMINATED INSTRUMENT PANEL
Filed May 5, 1927          2 Sheets-Sheet 2
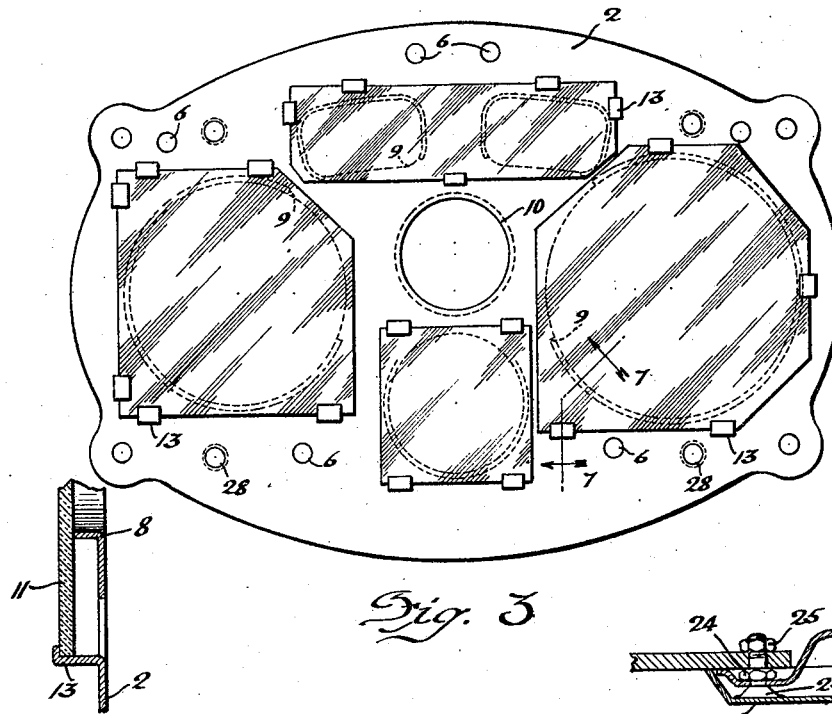
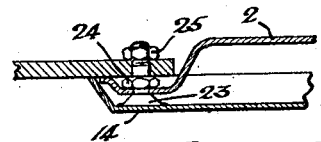
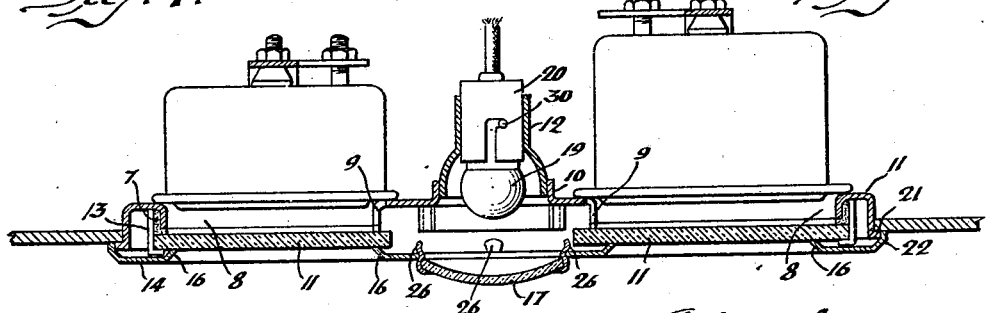
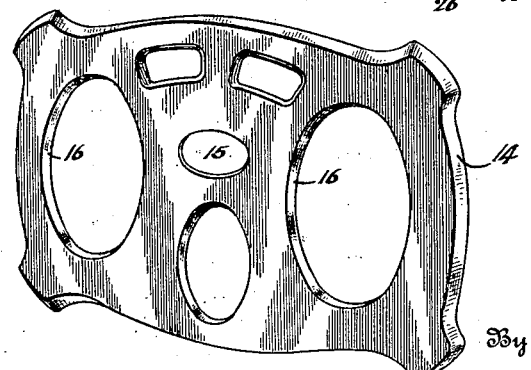
Inventor
Lloyd Blackmore
By Blackmore, Spencer & Flail
Attorney.

Patented Jan. 1, 1929.

1,697,806

UNITED STATES PATENT OFFICE.

LLOYD BLACKMORE, OF HIGHLAND PARK, MICHIGAN, ASSIGNOR TO GENERAL MOTORS CORPORATION, OF DETROIT, MICHIGAN, A CORPORATION OF DELAWARE.

ILLUMINATED INSTRUMENT PANEL.

Application filed May 5, 1927. Serial No. 189,060.

The invention relates to instrument panels for dial mechanisms.

It is an object of this invention to provide suitable means for mounting upon the dashboard of an automobile the several instruments which it is customary to provide. More specifically, it is an object of the invention to provide a structure which is composed of but few parts which may be easily and quickly fixed together to provide a dustproof unit which may be fixed to and removed from the dashboard. It is a further object to provide an instrument panel which is well illuminated from within by means of a single light bulb, with means for readily removing and replacing the light bulb, through the front of the instrument panel.

Other objects of the invention will appear in the course of the following description, taken in connection with the accompanying drawings, and will be more particularly pointed out in the appended claims.

In the drawings:

Figure 3 is a front view of the metal backplate showing the glass plates covering the dials and held to the plate by means of clips.

Figure 4 is a horizontal section, taken along the line 4—4 in Figure 1, showing the arrangement of the front and rear metal plates with the glass plates therebetween.

Figure 5 is a view in perspective of the front cover plate, showing the openings for the dials.

Figure 6 is a section taken along the line 6—6 of Figure 1, showing the means for attaching the plates to the dashboard.

Figure 7 is a section along the line 7—7 of Figure 3, showing the mounting of the glass plates on the rear metal plate.

Figure 1:
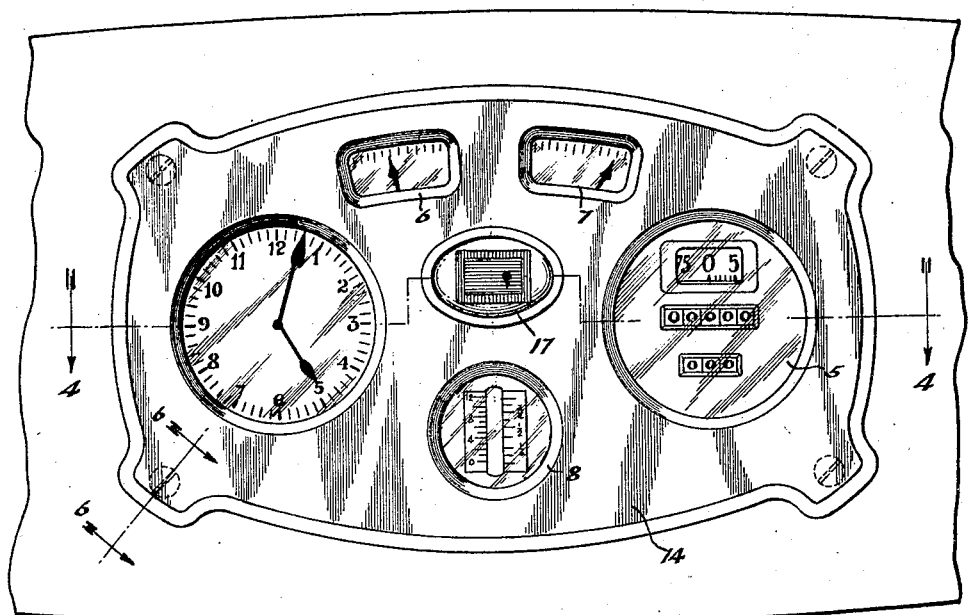
Figure 1 is a front view showing my improved mounting in position upon the dashboard of an automobile.
Figure 2:
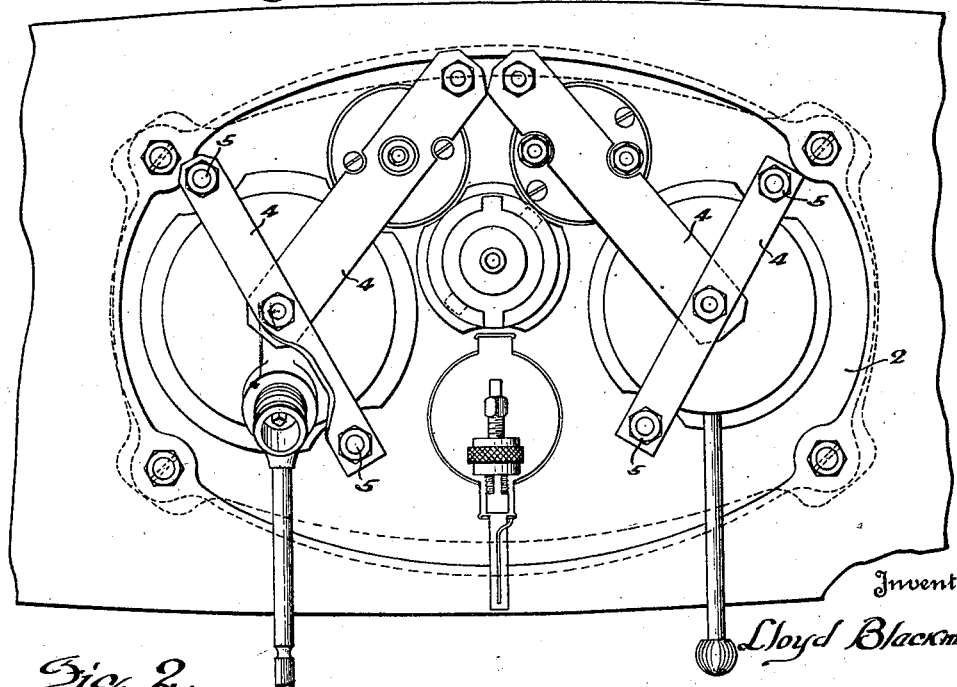
Figure 2 is a rear view of the rear plate, showing the means for attaching the separate indicators over their respective openings.

The panel comprises a rear metal plate carrying the dials, a front plate, preferably but not necessarily metal, with a glass plate between the two and covering the dials. The panel is fixed together as a unit and bolted in a properly shaped aperture in the dashboard.

In the drawings, the numeral 2 indicates the rear metal plate, provided with openings as indicated, and having fixed to the rear side thereof the various dials. The dials are arranged to fit smoothly against the rear plate at their respective apertures, being held firmly in place by any ordinary clamping means. The device I have illustrated comprises the metal plates or straps 4 fitting over the dials and fixed to the rear plate by means of bolts 5 extending through the openings 6 in the rear plate.

The numeral 12 indicates a substantially cone-shaped element fixed in the central opening 10, the rear plate being crimped rearwardly at this point. This element 12 may be fixed in place by any ordinary means as by welding, and fixed therein is the socket 20 for the light bulb 19. This light bulb is held in the socket in any ordinary way, as by the pin and slot arrangement indicated at 30.

At the openings for the dials, the rear plate is crimped or bent forward, as indicated at 8, the crimped position of each opening being cut away on the side toward the center aperture 10, as indicated at 9, to permit lighting of the various dials. Fitting over these crimped portions is the glass cover plate 11. This plate may be formed as a single plate with an opening over the central aperture 10, or it may comprise several separate plates, as shown in Figure 3. These plates may be of any desired configuration in order to fit in best with the desired arrangement of the dials, and are fixed to the rear plate by means of clips 13. I have shown these clips as comprising bent-up portions of the rear plate as indicated at 13 in Figure 7.

In the assembled unit the glass plate is held in position by the cover plate 14. The numeral 7 indicates a small strip of rubber or similar packing material. Strips of this material may be inserted about the crimped portions between the rear metal plate and the glass plate, as indicated at 7 in Figure 4. Fitting over the glass is the front plate 14, shown in Figure 5. At the various openings, except the central opening 15, the front plate is crimped in slightly or beveled, as at 16, in order to fit firmly on the glass plate. At the central opening 15 is removably secured the ornamental advertising plate 17, this plate carrying at spaced intervals about its periphery the spring elements 26 which normally hold it firmly but removably in the central aperture. The spring elements may be carried by either the advertising plate or the cover plate.

This assembled unit may be fixed to the dashboard by any ordinary means. I have shown the rear plate as fitting evenly around the opening in the dashboard, as at 21 in Figure 4, just inside the crimped edge 22 of the front plate. At the four corners, the plates are connected as indicated in Figure 6. In this figure a small bolt 23 is shown welded to the inner face of the outer plate. The two plates are then held together by a nut 24. The four bolts thus hold the elements together as a unit. These bolts are then extended through the small holes in the dashboard, and the panel held in place by the nuts 25. If desired the nut 24 may be omitted and the two plates fastened together by separate bolts or screws. In Figure 7 is shown the glass plate 11, fitting over the rear plate and held in place by the clip 13 comprising a bent-up strip of the rear metal plate.

The advantages of this arrangement are several. The light bulb is placed near the center of the panel, some of said instruments being disposed thereabove and others therebelow and extends out in front of the main portion of the rear plate so that the various dials will be lighted equally well. The cutaway portions 9 of the rear plate permit the light to reach all the dials, while the crimped edges 8 act to reflect the rays onto the dials. The assembled unit is firmly fixed together and is dust-proof.

What I claim is:

1. In combination with an instrument panel, dial mechanisms arranged at intervals around said panel, a light bulb substantially in the center within the panel some of said instruments being disposed thereabove and others therebelow and a removable cover over said bulb on the front of the panel,—said bulb being positioned at the rear of said panel and means being provided to admit light from said bulb to each of said dials.

2. In an instrument panel, a rear plate having apertures arranged thereabout over which are fixed dial mechanisms, said plate having a forwardly extending flange about each aperture, said flange being removed on the inner side of the apertures, a light bulb substantially in the center of said panel, and an outer apertured plate covering said rear plate.

3. In combination, the structure as recited in claim 2, a removable cover on said outer plate over said light bulb.

4. In an instrument panel, a rear metal plate, apertures arranged about said plate with the metal crimped forward, said crimped portion being cut away on the inner side, dials fixed over said apertures on the rear side of said plate, a light socket fixed substantially in the center of said panel, one or more transparent plates fitting over said metal plate covering said apertures, a front plate having openings corresponding to the arrangement of the dials, means for connecting said front and rear plates, and attaching means for said unit.

5. In combination with the structure as recited in claim 4, a removable cap fitting in said front plate over said light socket.

6. In an instrument panel, a rear metal plate having apertures arranged thereon with forwardly crimped edges, dial mechanisms fixed over said apertures, transparent plates over said metal plate and covering said dial mechanisms, a cover plate having apertures corresponding to the arrangement of the dials and bent in at its outer edge for fitting against said rear metal plate, means for rigidly fastening said plates together, and attaching means for said unit.

7. In a structure as recited in claim 6, a light socket fixed to said rear plate, said crimped portions being removed on the side toward said light socket.

8. In a structure as recited in claim 6, a light socket fixed to said rear plate, said crimped portions being removed on the side toward said light socket, and a removable plate in said cover plate over said light socket.

9. In an instrument panel, a rear dial carrying plate bent out at its periphery for fitting in a corresponding aperture in the dashboard, a cover plate for said rear plate fitting over and outside the periphery of the rear plate, means for connecting said plates together and means for connecting said outer plate to the dashboard.

10. In an instrument panel, a rear metal plate having dial apertures and crimped forward at said apertures, a light bulb opening, a light socket fitting over said openings and carrying a light bulb extending slightly forward of the main part of the rear plate, the crimped portions of the rear plate being cut away on the sides adjacent the light bulb, dials fitting over said dial apertures and fastened to the rear plate, and a cover for said structure comprising transparent portions over said dials.

11. The combination of an instrument panel comprising an opaque front plate and an opaque rear plate each having separate apertures therein, instruments fixed to said panel and having dials visible through said apertures, a light bulb supported by said rear plate on the rear side of said panel some of said instruments being disposed thereabove and others therebelow, means for admitting light from said light bulb and between said plates to said dials, and a removable cover in the front plate of said panel for providing ready access to said light bulb,—said removable cover being provided wtih spring means for its normal retention by engagement with said front plate.

In testimony whereof I affix my signature.

LLOYD BLACKMORE.